UNITED STATES PATENT OFFICE.

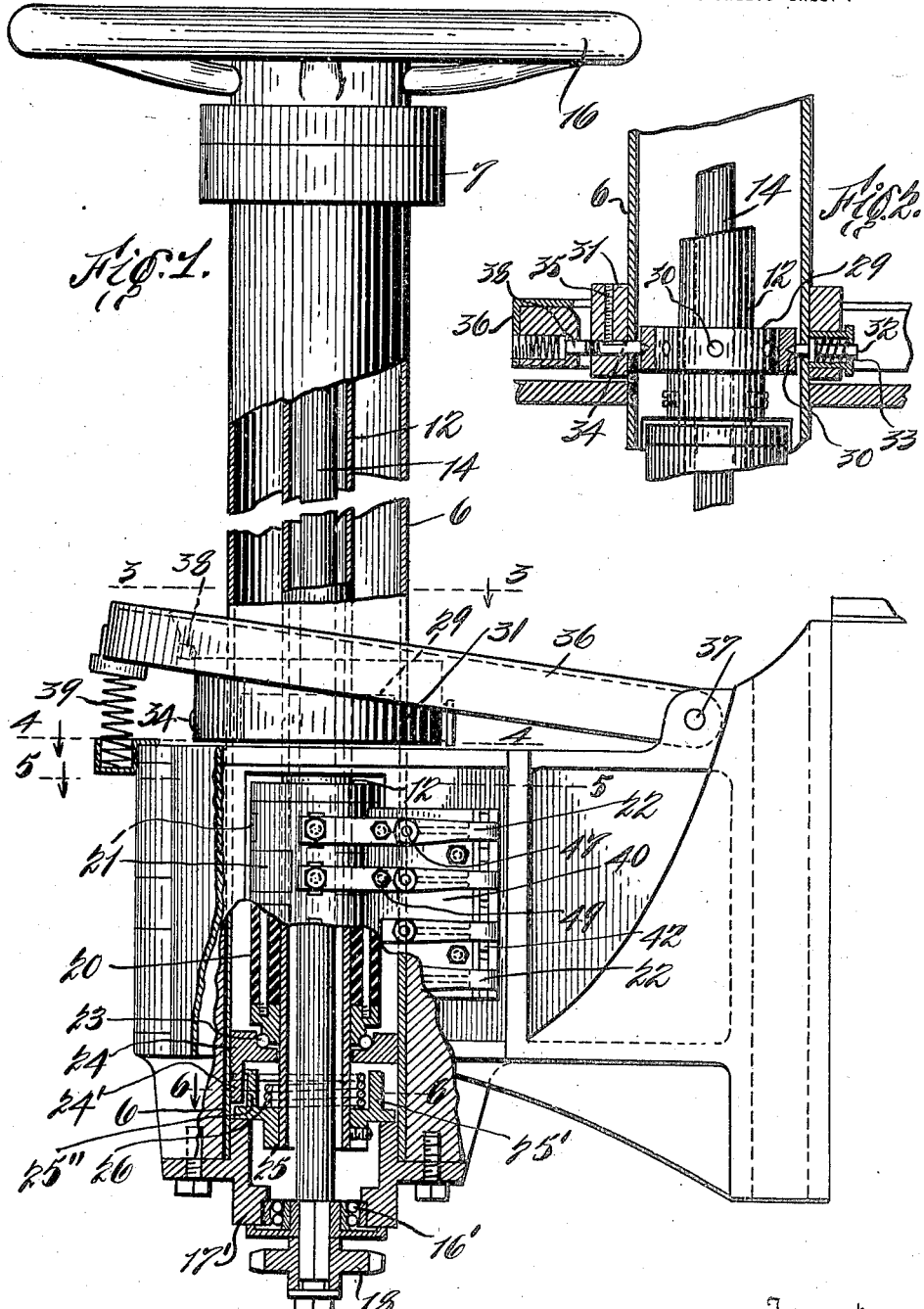

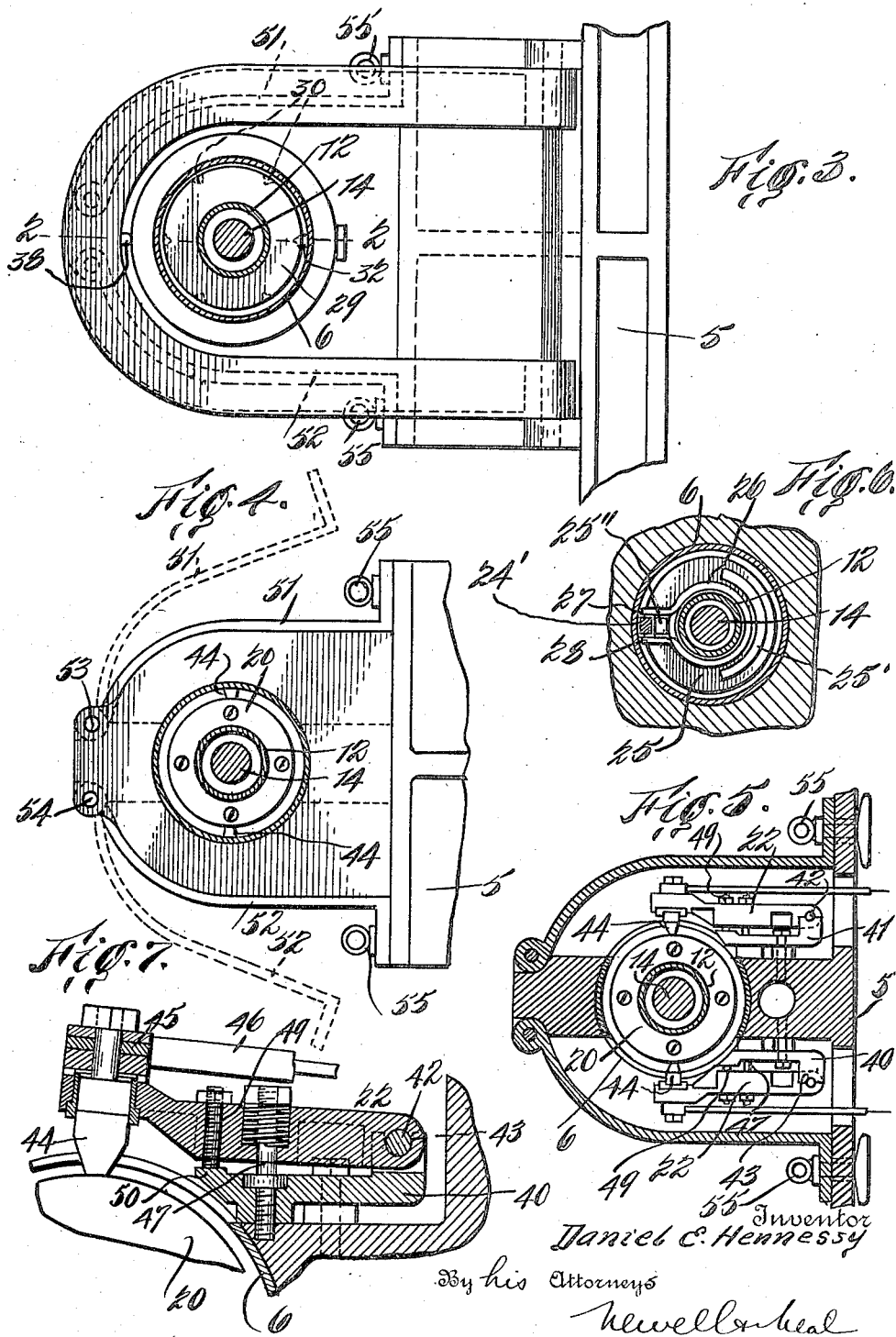

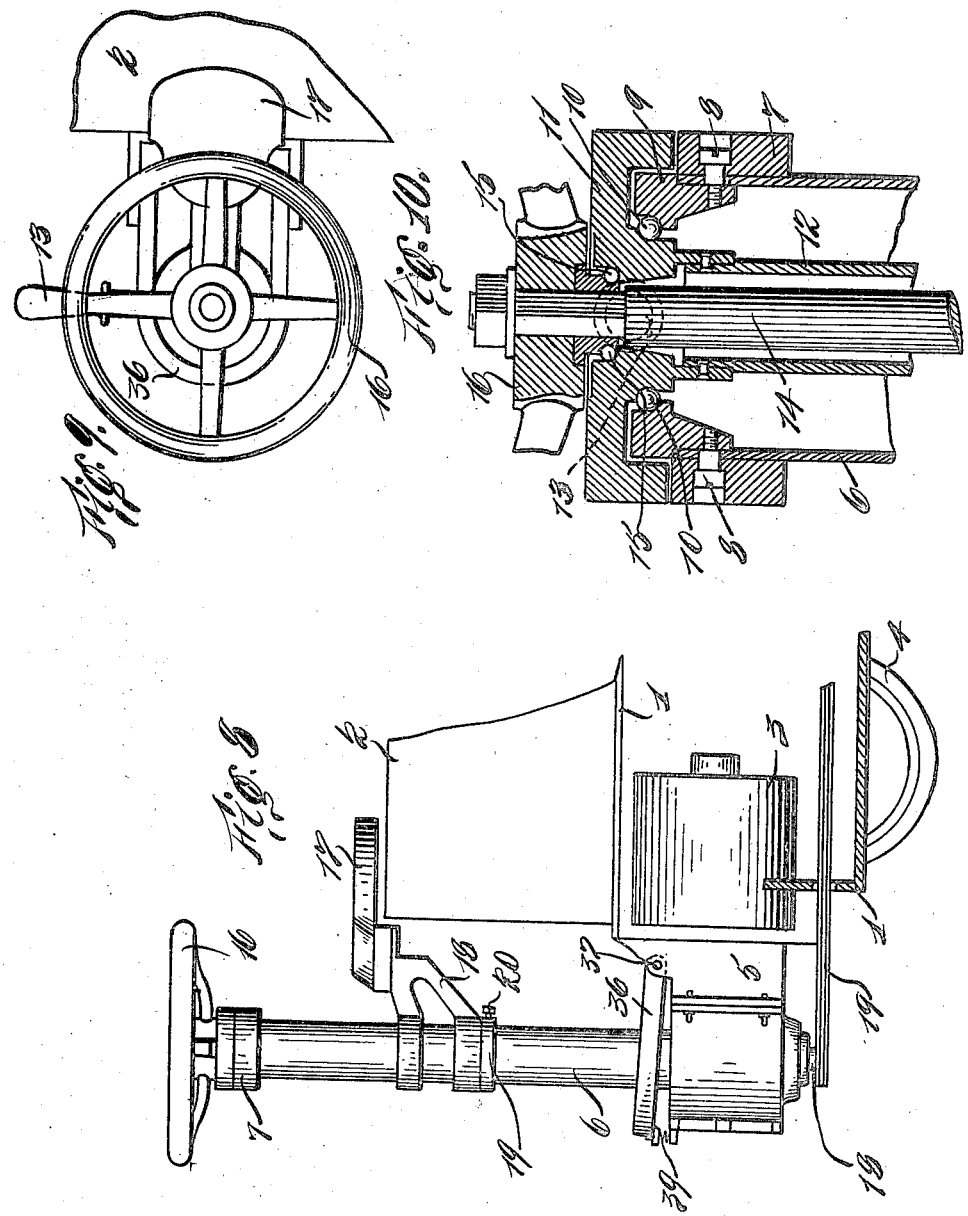

DANIEL E. HENNESSY, OF HOLYOKE, MASSACHUSETTS, ASSIGNOR TO HERBERT W. COWAN, J. LEWIS WYCKOFF, AND EDWARD N. WHITE, TRUSTEES DOING BUSINESS AS THE COWAN TRUCK COMPANY.

STEERING-COLUMN.

1,302,044.       Specification of Letters Patent.       Patented Apr. 29, 1919.

Application filed June 30, 1917. Serial No. 177,995.

*To all whom it may concern:*

Be it known that I, DANIEL E. HENNESSY, a citizen of the United States, residing at Holyoke, Massachusetts, have invented certain new and useful Improvements in Steering-Columns, of which the following is a clear, full, and exact description.

This invention relates to a steering column for electrically propelled vehicles, and more particularly for vehicles of the baggage truck or freight handling type. The usefulness of the improvement, however, is not limited to electrically propelled vehicles of this type but may be employed with equal advantage in various other types of vehicles.

The objects of the invention are to simplify and improve the control and operation of such trucks, to insure safety against accident and careless manipulation, and, in general, to make a compact and inexpensive construction which will serve all the requirements of such trucks.

One of the several advantages of the present invention is that the operator has means for both steering the truck and for controlling its speed, mounted adjacent one another at the head of a steering column. The steering is preferably accomplished by means of a hand-wheel and the electrical control preferably by a lever mounted adjacent thereto so that the operator may conveniently shift his hand from one to the other. A seat for the operator is preferably arranged so as to be shifted around the steering column and thus enable the operator to face in the most advantageous direction when guiding and controlling the truck, either running forwardly or backwardly.

A further advantage of the improvement consists in providing means for automatically returning the controller to neutral or non-running position as soon as the operator leaves his seat or raises his foot; on the other hand, so long as the operator keeps his foot depressed, the controller will be retained in its various adjusted positions for the different traveling speeds of the vehicle, leaving both hands of the operator free to handle the steering wheel.

Other and further advantages of the improvement will become apparent from the following description and accompanying drawings which disclose the preferred embodiment of the invention.

Referring briefly to the drawings, Figure 1 is an elevation of the steering column partly in section;

Fig. 2 is a detail vertical section through the foot treadle and steering column along line 2—2 of Fig. 3;

Fig. 3 is a horizontal section through the steering column along line 3—3 of Fig. 1 and showing the foot treadle in plan;

Fig. 4 is a horizontal section along line 4—4 of Fig. 1;

Fig. 5 is a horizontal section along line 5—5 of Fig. 1, through the upper end of the controller drum;

Fig. 6 is a detail section along line 6—6 through the lower end of the controller drum;

Fig. 7 is a detail section showing the construction of a conducting arm;

Fig. 8 is an elevation of the steering column shown as mounted at the front end of an electrically propelled vehicle;

Fig. 9 is a top view of the column showing the steering wheel and controller handle; and Fig. 10 is a detail vertical section through the upper end of a steering column.

Referring more particularly to the drawings, 1 indicates the frame of an electrically operated vehicle of any suitable character, the particular construction of which need not be described. Upon said vehicle is the usual battery box 2, motor 3, and traction wheels 4. The steering column is supported at one end of the vehicle upon a suitable bracket such as 5, and comprises in the preferable embodiment shown an outer tubular casing 6 fixedly mounted within the bracket 5. At the upper end of the casing 6 is secured a collar 7 by means of stud screws 8, see Fig. 10. Adjacent said collar 7 and within the casing 6 is a cone bearing 9 upon which is supported, through intervening balls 10, a rotatable cap 11. A controller tube 12 is fixed to said rotatable cap 11, and, as shown in Fig. 9, a handle 13 extends from one side of said cap 11 so as to turn the same together with its associated controller tube 12. Mounted concentrically within the controller tube 12 is the steering shaft 14, supported at its upper end upon said cap 11, preferably by ball bearings 15. The steering wheel 16 is fixed to the upper end of said steering shaft 14.

As shown in Fig. 8, an operator's seat 17 is supported adjacent the steering column 6 preferably by a bracket 18 swiveled on the outside of said casing 6 and bearing upon a collar 19 fixed to said casing by stud 20. In this manner the operator seated upon the seat 17 may swing around to all sides of said steering column 6 for facing in any direction desired, and in whatever position he may be, his steering wheel 16 and controller handle 13 are equally accessible and convenient for manipulation.

Referring to Fig. 1, the lower end of shaft 14 may be suitably mounted, as shown, in ball bearings 16' within a bearing collar 17', the latter fixed to the supporting bracket 5 in any suitable manner. The protruding end of the steering shaft 14 may be employed for manipulating any suitable form of steering gear by means of linkage or otherwise. In the present form of my invention I have fixed a sprocket wheel 18 to the lower end of the steering shaft 14, and through the medium of a chain 19 operate the steering wheels. The particular mechanism operated by the chain 19 is not herein shown but forms the subject-matter of a separate and co-pending application.

Upon the lower portion of the controller tube 12 is fixed an electric controller drum 20 having suitable contacts 21 thereon arranged in combination with conducting arms 22 to control the speed of the motor 3 in the usual way. The lower end of the controller drum 12 is preferably supported through ball bearings 23 upon a bearing collar 24 fixed to the tubular casing 6 and having a depending lug 24' (see Figs. 1 and 6). A lower extension of the controller tube 12 has fixed thereto a spring holder 25 within which is carried a coiled spring 26. As shown more particularly in Fig. 6, this holder has an upright wall 25' of arcuate form at one side and an upstanding lug 25" at the other side. The lug 25" normally stands opposite the fixed lug 24' which is the neutral or non-running position of the controller, in which position it is understood that the contacts 21 are in such relation with respect to the conductor arms 22 that no currrent will be delivered from the battery 2 to the motor 3. One free end 27 of the spring 26 projects along one side of said lugs 24' and 25", and the other free end 28 of said spring projects along the other side of said lugs 24' and 25", whereby said spring tends to hold said controller tube yieldingly in the neutral position shown in Fig. 6 and acts to return said controller tube to this same position whenever said tube is turned in either direction away therefrom.

In addition to the return spring 26, means are provided to center the controller tube in its neutral position, and for this purpose I have fixed to the controller tube 12 a locating recess collar 29, see Fig. 2. The collar 29 is provided with suitable pin receiving recesses 30, one of which is a neutral position recess and other recesses 30' are for different running speeds of said motor.

Upon the fixed casing 6, outside of said collar 29, is secured a pin-holding collar 31, which at one side carries a centering pin 32 impelled by spring 33 for entering the neutral position recess 30 of collar 29. At the other side of said collar 31 is a loose slidable pin 34 limited in its sliding movement by screw stud 35 and which is adapted to enter the various speed positioning recesses 30' of the collar 29. Said sliding pin 34 is impelled to enter the speed positioning recesses 30', preferably by the following means. A foot treadle 36 is pivoted at 37 upon the bracket 5 and is preferably in the form of a yoke as shown in Fig. 3, extending around said steering column 6. The forward end of said treadle carries a spring-pressed pin 38 which, when said treadle is depressed into the position shown in Fig. 2, comes into line with the sliding pin 34 and pushes the latter inwardly against the recess collar 29, whereby said sliding pin 34 tends to enter the speed positioning recesses 30' for frictionally holding said controller tube in its adjusted positions. A spring 39 is employed to normally keep the foot treadle 36 in raised position, thus relieving the controller tube and recess collar 29 from any frictional pressure on the part of pin 34.

It will be understood from this construction that the return spring 26 tends at all times to return the controller tube 12 to its initial or neutral position in which the motor will not run, and that the controller tube is frictionally held in this position by the pin 32 entering the neutral positioning recess 30 of the collar 29. Since the controller tube is only frictionally held in this position, it may be easily manipulated by the handle 13 to adjust the controller drum to the various different running speeds of the motor, said controller tube being turned in one direction, of course, for operating the motor forwardly, and in the other direction for operating the motor rearwardly. For each running position of the motor there is provided a recess 30' upon the collar 29, and so long as the operator keeps his foot treadle 36 depressed, the pin 34 will frictionally hold the controller tube in any of the adjusted running positions into which it may be put by the controller handle 13. After being set in one running position, the operator does not need to keep his hand on the controller lever 13 but may employ both hands for steering the truck. If, however, the operator leaves his seat or removes his foot from the treadle 36, the latter will be automatically elevated by the spring 39 so as to release the collar 29 from the frictional engagement of the pin 34. The spring 26 thereupon immediately returns the controller tube to neutral position where it is centered by the neutral positioning pin 32, the motor stops running and the machine will come to a stop.

In some cases suitable brake mechanism may also be connected with the foot treadle 36 so as to be automatically thrown into operation as soon as said foot treadle is elevated, to thus further insure the stopping of the machine should the operator take his foot away from the treadle. The connections from a foot treadle to such an automatically operated brake mechanism form the subject-matter of a co-pending application, and therefore need not be herein described.

The detailed wiring connections between the battery 2 and the controller drum are not herein shown, as these may be made in the conventional manner for obtaining three forward and three reverse speeds together with a neutral or non-running position. The construction of the conducting arms which bear upon the controller drum is shown more clearly in Figs. 5 and 7. It is understood that several of these conducting arms are provided at each side of said controller drum, as shown in partial elevation in Fig. 1, one-half of said arms being pivotally mounted upon a base plate 40 and the other half upon base plate 41. Said base plates are suitably fastened to a portion of the fixed bracket 5. Each conducting arm is preferably constructed as a rigid member with a pivot 42 in an open recess 43 of the bearing block such as 40, and the outer end of said arm carries a conducting brush 44. A terminal connection 45 at the outer end of said brush 44 receives the flexible cable 46 for conducting the current to said brush. Intermediate the ends of each arm 22 is a tension device for maintaining said arm in yielding contact with the drum, which tension device comprises a stud bolt 47 threaded at its lower end within the base plate 40 and with an adjustable nut upon its upper end for retaining a spring within a recess of said arm 22. An adjustable stud 49 is also carried on each arm 22 with the lower end bearing upon a shoulder 50 of the base plate 40, whereby the pivotal play of said arm 22 may be limited and adjusted.

By the construction above described, the conduction of current to and from the controller drum is made more certain, and deleterious sparking and loss of power is avoided. The controller drum with its associated conducting arms is preferably inclosed within a removable hooded structure comprising pivoted covers 51 and 52 pivoted at 53 and 54, respectively, at the front end of the bracket 5, said covers being fastened in closed position by any suitable latch bolts, such as 55.

It will be understood, of course, that various changes in details and modification of structure may be made in the construction heretofore described without departing from the spirit and scope of the invention as hereinafter claimed.

What I claim as new is:—

1. In a steering column for electrically propelled vehicles in combination, a rotatable steering shaft, an independently rotatable tube surrounding said shaft and having an electric controller drum thereon and adapted to be turned by the operator to various running positions, and means tending at all times to return said controller tube to its initial position of no running.

2. In a steering column for electrically propelled vehicles in combination, a rotatable steering shaft, an independently rotatable tube surrounding said shaft and having an electric controller drum thereon and adapted to be turned by the operator to various running positions in either direction, and means tending at all times to return said controller tube to its neutral position.

3. In a steering column for electrically propelled vehicles in combination, a rotatable steering shaft, an independently rotatable tube surrounding said shaft and having an electric controller drum thereon and adapted to be turned by the operator to various running positions, means tending at all times to return said controller tube to its initial position of no running, and a foot-treadle depressible by the operator for rendering said returning means ineffective, said foot-treadle being automatically elevated in the absence of the operator.

4. In a steering column for electrically propelled vehicles in combination, a rotatable steering shaft, an independently rotatable tube surrounding said shaft and having an electric controller drum thereon and adapted to be turned by the operator to various running positions, and means automatically acting in the absence of said operator to return said controller tube to its initial position of no running.

5. In a steering column for electrically propelled vehicles in combination, a rotatable steering shaft, an independently rotatable tube surrounding said shaft and having an electric controller drum thereon and adapted to be turned by the operator to various running positions, means tending at all times to return said controller tube to its initial position of no running, and holding means for retaining said controller tube in adjusted positions against the action of said returning means.

6. In a steering column for electrically propelled vehicles in combination, a rotatable steering shaft, an independently rotatable tube surrounding said shaft and having an electric controller drum thereon and adapted to be turned by the operator to various running positions, means tending at all times to return said controller tube to its initial position of no running, and holding means for retaining said controller tube in adjusted positions against the action of said returning means, said holding means being made effective by pressure of the operator's foot and rendered ineffective in the absence of the operator.

7. In a steering column for electrically propelled vehicles in combination, a rotatable steering shaft, an independently rotatable tube surrounding said shaft and having an electric controller drum thereon, foot-actuated releasable means for retaining said controller tube in adjusted positions, and means for automatically returning said controller drum to its initial position when released.

8. In a steering column for electrically propelled vehicles in combination, a rotatable steering shaft, an independently rotatable tube surrounding said shaft and having an electric controller drum thereon and adapted to be turned by the operator to various running positions, means tending at all times to retain said controller tube to its initial position of no running, and holding means for retaining said controller tube in adjusted positions, comprising a foot-treaddle having engagement with said controller tube when depressed and adapted to release the same when elevated.

9. In a steering column for electrically propelled vehicles in combination, a rotatable steering shaft, an independently rotatable tube surrounding said shaft and having an electric controller drum thereon and adapted to be turned by the operator to various running positions, means tending at all times to return said controller tube to its initial position of no running, holding means for retaining said controller tube in adjusted positions, comprising a foot-treadle having engagement with said controller tube when depressed and adapted to release the same when elevated, and yieldable means tending to maintain said controller tube in its initial position, comprising a spring pressed friction device.

10. In a steering column for electrically propelled vehicles in combination, a rotatable inner steering shaft, an independently rotatable tube surrounding said shaft and having an electric controller drum thereon, means for holding said controller tube in adjusted positions, comprising a treadle having a spring pressed frictional engagement with said controller tube when depressed and adapted to release the same when elevated.

11. In a steering column for electrically propelled vehicles in combination, a rotatable inner shaft, an independently rotatable tube surrounding said shaft and having an electric controller drum thereon mounted within a fixed tubular casing, an operator's seat swivelly mounted on said fixed casing so as to swing around upon all sides of the same.

12. In a steering column for electrically propelled vehicles in combination, a rotatable inner shaft, an independently rotatable tube surrounding said shaft and having an electric controller drum thereon, contacts on said drum, and conducting arms pivotally mounted adjacent said drum and adapted to bear against said drum contacts, each conducting arm having tension means for pressing the same against said controller drum and adjusting means for limiting the pivotal play of said arm, and a terminal connector at the contacting end of said arm.

Signed at Holyoke, Massachusetts, this 2nd day of June, 1917.

DANIEL E. HENNESSY.

Copies of this patent may be obtained for five cents each, by addressing the "Commissioner of Patents, Washington, D. C."